United States Patent
Tsang et al.

(10) Patent No.: US 10,107,954 B2
(45) Date of Patent: Oct. 23, 2018

(54) ELECTRO-OPTICAL APPARATUS AND SCENE APPARATUS EACH HAVING A TAPER LIGHT GUIDE ELEMENT

(71) Applicant: Young Lighting Technology Inc., Hsin-Chu (TW)

(72) Inventors: Chih-Jen Tsang, Hsin-Chu (TW); Tzeng-Ke Shiau, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 356 days.

(21) Appl. No.: 14/997,572

(22) Filed: Jan. 18, 2016

(65) Prior Publication Data

US 2016/0223737 A1    Aug. 4, 2016

(30) Foreign Application Priority Data

Jan. 30, 2015   (TW) .............................. 104103202 A

(51) Int. Cl.
*F21V 8/00* (2006.01)
(52) U.S. Cl.
CPC ......... *G02B 6/0068* (2013.01); *G02B 6/0006* (2013.01)
(58) Field of Classification Search
CPC .. G02B 6/0068; G02B 6/0006; G02B 6/0008; G02B 6/0065; G02B 6/24
USPC ....................................... 362/610
See application file for complete search history.

(56) References Cited

U.S. PATENT DOCUMENTS

| | | | |
|---|---|---|---|
| 5,914,775 A * | 6/1999 | Hargrove ................ | F41G 1/467 124/87 |
| 6,505,939 B1 * | 1/2003 | Bierhuizen ........ | G02B 26/0841 348/755 |
| 6,672,740 B1 * | 1/2004 | Li ........................ | F21V 7/0025 362/201 |
| 2005/0031271 A1 | 2/2005 | Saccomanno | |

(Continued)

FOREIGN PATENT DOCUMENTS

| CN | 1299978 | 6/2001 |
|---|---|---|
| TW | M277951 | 10/2005 |

(Continued)

OTHER PUBLICATIONS

"Office Action of Taiwan Counterpart Application", dated Jan. 25, 2016, p. 1-p. 6, in which the listed references were cited.

*Primary Examiner* — Anh Mai
*Assistant Examiner* — Hana Featherly
(74) *Attorney, Agent, or Firm* — JCIPRNET

(57) ABSTRACT

An electro-optical apparatus including an electronic apparatus and at least one light-emitting module is provided. The electronic apparatus has a containing area. The light-emitting module is disposed in the containing area and includes at least one light-emitting element, a taper light guide element, and a strip light guide element. The light-emitting element emits at least one beam. The taper light guide element is disposed on the transmission path of the beam and has a first end and a second end opposite to each other. The taper light guide element tapers off from the first end toward the second end. The first end is adjacent to the light-emitting element. The strip light guide element is disposed on the transmission path of the beam from the taper light guide element. The second end is adjacent to the strip light guide element. A scene apparatus is also provided.

18 Claims, 3 Drawing Sheets

(56) References Cited

U.S. PATENT DOCUMENTS

| | | | |
|---|---|---|---|
| 2006/0002658 A1* | 1/2006 | Watanabe | G02B 6/2808 |
| | | | 385/43 |
| 2010/0278478 A1* | 11/2010 | Kuo | G02B 6/2808 |
| | | | 385/24 |
| 2011/0128611 A1 | 6/2011 | Lin et al. | |
| 2014/0146520 A1 | 5/2014 | Tosh et al. | |

FOREIGN PATENT DOCUMENTS

| | | |
|---|---|---|
| TW | 201011198 | 3/2010 |
| WO | 0005609 | 2/2000 |

* cited by examiner

ELECTRO-OPTICAL APPARATUS AND SCENE APPARATUS EACH HAVING A TAPER LIGHT GUIDE ELEMENT

CROSS-REFERENCE TO RELATED APPLICATION

This application claims the priority benefit of Taiwan application serial no. 104103202, filed on Jan. 30, 2015. The entirety of the above-mentioned patent application is hereby incorporated by reference herein and made a part of this specification.

BACKGROUND OF THE INVENTION

Field of the Invention

The invention relates to an electro-optical apparatus and a scene apparatus, more particularly, to an electro-optical apparatus and a scene apparatus each having a taper light guide element.

Description of Related Art

In general, to generate a multi-hued scene lighting effect, the thickness of an electronic product is increased. Moreover, to achieve the thinning demand of an electronic product, scene lighting effect is sacrificed.

US Patent Publication No. 20050031271A1 discloses an optical fiber coupler having a transparent hollow insert and a metal pipe, and the transparent hollow insert has an input tapered region, a coupling region, and a constant area region. US Patent Publication No. 20110128611A1 discloses a double cladding crystal fiber and a single cladding fiber, and the diameter of the fiber of each thereof can be gradually changed from small to large or gradually changed from large to small. Taiwan Utility Model Patent Publication No. M277951 discloses a backlight module including light guide columns and light source bodies located at four sides of the backlight module, a reflective tape can be adhered on the light guide columns to form a reflective layer, and the light guide columns can be cylinders made from an optical fiber material. US Patent Publication No. 20140146520A1 discloses a display panel and a display border. Light pipes in the backlight module guide different levels of red, green, and blue lights from red, green, and blue light-emitting diodes of the backlight module to side surfaces of the display border, such that the display border renders different lighting colors. However, the above techniques still have many issues that cannot be overcome.

The above about the prior art techniques are only intended to facilitate understanding of the contents of the invention, and therefore the contents disclosed in the above about the prior art techniques may contain some prior art techniques not known to those having ordinary skill in the art. The contents disclosed in the above about the prior art techniques do not contain issues to be solved by the contents or one or a plurality of embodiments of the invention, and also do not entail that the contents are known or recognized by those having ordinary skill in the art prior to the application of the invention.

SUMMARY OF THE INVENTION

The invention provides an electro-optical apparatus that can have multi-hued scene effect and lighting effect, and can have the advantage of thinning.

The invention provides a scene apparatus that can have multi-hued scene effect and lighting effect, and can have the advantage of thinning Other objects and advantages of the invention can be further understood via the technical features disclosed in the invention.

In order to achieve one or a portion of or all of the above objects or other objects, an embodiment of the invention provides an electro-optical apparatus. The electro-optical apparatus includes an electronic apparatus and at least one light-emitting module. The electronic apparatus has a containing area. The light-emitting module is disposed in the containing area and includes at least one light-emitting element, a taper light guide element, and a strip light guide element. The light-emitting element emits at least one beam. The taper light guide element is disposed on the transmission path of the beam and has a first end and a second end opposite to each other, and the taper light guide element tapers off from the first end toward the second end, wherein the first end is adjacent to the light-emitting element. The strip light guide element is disposed on the transmission path of the beam from the taper light guide element. The second end is adjacent to the strip light guide element.

In order to achieve one or a portion of or all of the above objects or other objects, an embodiment of the invention provides a scene apparatus. The scene apparatus includes a main body and at least one light-emitting module. The main body has a containing area. The light-emitting module is disposed in the containing area and includes at least one light-emitting element, a taper light guide element, and a strip light guide element. The light-emitting element emits at least one beam. The taper light guide element is disposed on the transmission path of the beam and has a first end and a second end opposite to each other, and the taper light guide element tapers off from the first end toward the second end, wherein the first end is adjacent to the light-emitting element. The strip light guide element is disposed on the transmission path of the beam from the taper light guide element. The second end is adjacent to the strip light guide element.

In an embodiment of the electro-optical apparatus and the scene apparatus of the invention, the light-emitting module further includes at least one reflection unit configured to reflect a beam. The reflection unit is disposed on at least a portion of a sidewall of the taper light guide element, wherein the sidewall is connected between the first end and the second end.

In an embodiment of the electro-optical apparatus and the scene apparatus of the invention, the taper light guide element has a sidewall connected between the first end and the second end, and the sidewall includes a first sub-sidewall, a second sub-sidewall, a third sub-sidewall, and a fourth sub-sidewall. The second sub-sidewall is opposite to the first sub-sidewall, wherein the spacing between the first sub-sidewall and the second sub-sidewall is substantially the same from a side adjacent to the first end toward a side adjacent to the second end. The third sub-sidewall is connected between the first sub-sidewall and the second sub-sidewall. The fourth sub-sidewall is connected between the first sub-sidewall and the second sub-sidewall, and is opposite to the third sub-sidewall. The spacing between the third sub-sidewall and the fourth sub-sidewall tapers off from a side adjacent to the first end toward a side adjacent to the second end.

In an embodiment of the electro-optical apparatus and the scene apparatus of the invention, the light-emitting module further includes two reflection units respectively disposed on the third sub-sidewall and the fourth sub-sidewall and configured to reflect a beam.

In an embodiment of the electro-optical apparatus and the scene apparatus of the invention, the strip light guide element is an optical fiber.

In an embodiment of the electro-optical apparatus and the scene apparatus of the invention, the area of the second end of the taper light guide element is equal to or less than the area of an end of the strip light guide element adjacent to the taper light guide element.

In an embodiment of the electro-optical apparatus and the scene apparatus of the invention, the strip light guide element is an optical fiber for which the diameter is in the range of 0.1 mm to 3.5 mm.

In an embodiment of the electro-optical apparatus and the scene apparatus of the invention, the taper light guide element and the strip light guide element are an integrally formed optical fiber.

In an embodiment of the electro-optical apparatus and the scene apparatus of the invention, the containing area is located on at least one side of the electronic apparatus, and the strip light guide element is extended on the side.

In an embodiment of the scene apparatus of the invention, the number of each of the light-emitting unit and the beam is a plurality, and the colors of the beams are different.

In an embodiment of the scene apparatus of the invention, the scene apparatus further includes a control unit electrically connected to the light-emitting elements and configured to switch the colors of the beams.

Based on the above, the embodiments of the invention can achieve at least one of the following advantages or efficacies. The light-emitting module of each of the electro-optical apparatus and the scene apparatus of the embodiments of the invention can adopt a strip light guide element having a small diameter via the configuration of a taper light guide element. Therefore, the thickness of each of the electro-optical apparatus and the scene apparatus can be effectively reduced when scene hue and/or lighting hue are adjusted, such that the thinning demand of an electronic product can be achieved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The foregoing and other technical contents, features, and efficacies related to the invention can be more clearly understood in the detailed descriptions of preferred embodiments accompanied with reference drawings below. The language used to describe directions such as up, down, left, right, front, back or the like in the embodiments below are only the directions in the reference drawings. Thus, the language used to describe the directions is descriptive and not intended to limit the scope of the invention.

Figure 1:
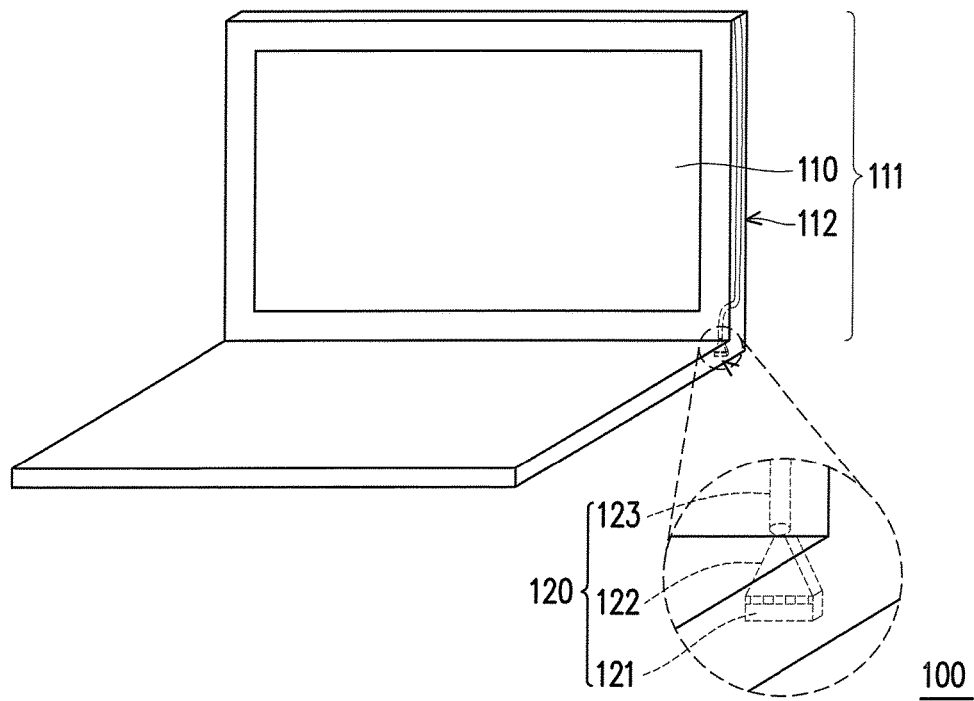
FIG. 1 is an architecture schematic of an electro-optical apparatus of an embodiment of the invention.
Figure 2A:
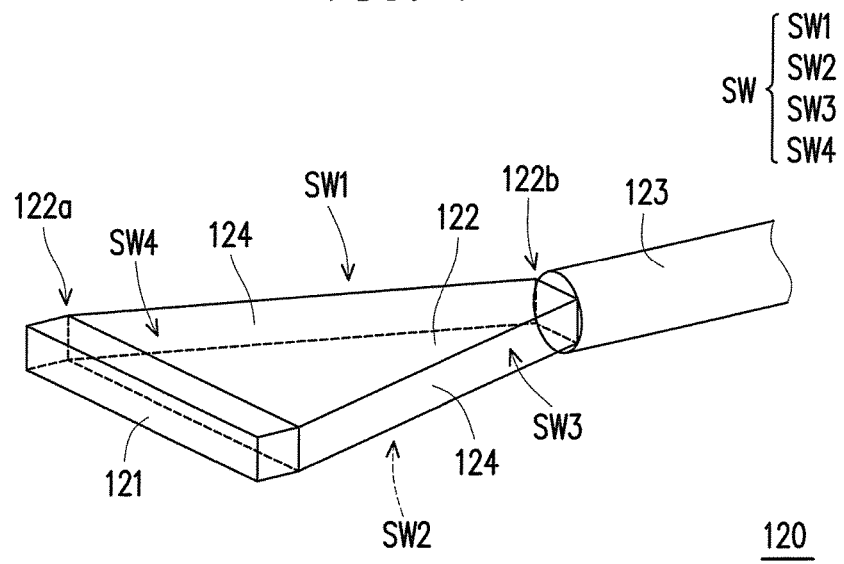
FIG. 2A is a stereoscopic view of a light-emitting module of FIG. 1.

FIG. 1 is an architecture schematic of an electro-optical apparatus of an embodiment of the invention. FIG. 2A is a stereoscopic view of a light-emitting module of FIG. 1. Referring to FIG. 1 and FIG. 2A, in the present embodiment, an electro-optical apparatus 100 includes an electronic apparatus 110 and at least one light-emitting module 120, wherein FIG. 1 illustrates one light-emitting module 120 as example, but the invention is not limited thereto. For instance, in the present embodiment, the electronic apparatus 110 can be, a notebook computer, a television, a liquid crystal screen, a display screen of a mobile phone, a projection apparatus, a speaker apparatus, a stereo, or other suitable electronic products. Specifically, as shown in FIG. 1, the electronic apparatus 110 has a containing area 111, and the light-emitting module 120 is disposed in the containing area 111. The containing area 111 of the present embodiment is, for instance, located on one side 112 of the electronic apparatus 110. However, the invention does not limit the position of the containing area. In other embodiments, the position of the containing area can be decided according to the shape or structure of the electronic apparatus. For instance, the containing area can also be disposed in the center or between the center and a side of the electronic apparatus.

Moreover, as shown in FIG. 1 and FIG. 2A, the light-emitting module 120 includes at least one light-emitting element 121, a taper light guide element 122, and a strip light guide element 123, wherein FIG. 1 and FIG. 2A illustrate one light-guide element 121 as example, but the invention is not limited thereto. Moreover, the strip light guide element 123 is, for instance, extended on the side 112 of the electronic apparatus 110, wherein the side 112 is, for instance, the side of the screen. However, the invention is not limited thereto, and in other embodiments, the side can also be a keypad (such as a keyboard) or the side of an operating area (such as an operating mouse or an area in which a user can execute a touch operation or other functional operations).

Figure 2B:
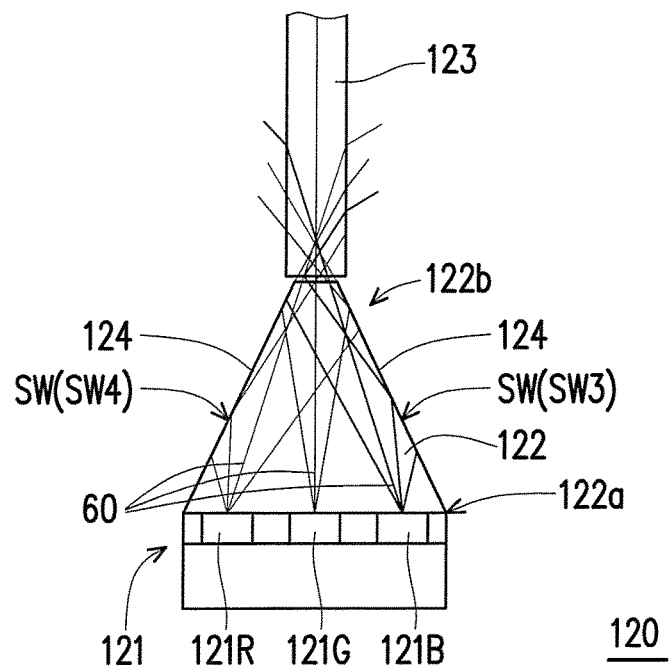
FIG. 2B is an optical path schematic of a light-emitting module of FIG. 2A.

FIG. 2B is an optical path schematic of a light-emitting module of FIG. 2A. Specifically, as shown in FIG. 2B, in the present embodiment, the light-emitting element 121 is configured to emit a beam 60. However, in other embodiments, the light-emitting element 121 can also emit a plurality of beams as needed. In the present embodiment, the taper light guide element 122 is disposed between the strip light guide element 123 and the light-emitting element 121, and disposed on the transmission path of the beam 60. In the present embodiment, the strip light guide element 123 is disposed on the transmission path of the beam 60 from the taper light guide element 122.

Accordingly, as shown in FIG. 2B, the taper light guide element 122 has a first end 122a and a second end 122b opposite to each other, and the taper light guide element 122 tapers off from the first end 122a toward the second end 122b, wherein the first end 122a is adjacent to the light-emitting element 121, and the second end 122b is adjacent to the strip light guide element 123. Moreover, to increase the light use efficiency of the light-emitting module 120, the light-emitting module 120 of the present embodiment can further be provided with a reflection unit 124 configured to reflect the beam 60, so as to increase the light mixing effect and/or light coupling effect. The reflection unit 124 of the present embodiment is, for instance, disposed on the left inner sidewall and the right inner side wall (described in detail later) of the taper light guide element 122. However, the invention does not limit the number and position of the reflection unit. For instance, a single reflection unit or more than two reflection units can be disposed as needed, or the position of the reflection unit can be adjusted to other inner sidewalls as needed.

More specifically, as shown in FIG. 2A and FIG. 2B, in the present embodiment, the taper light guide element 122 has a sidewall SW connected between the first end 122a and the second end 122b, and the sidewall SW includes a first sub-sidewall SW1, a second sub-sidewall SW2, a third sub-sidewall SW3, and a fourth sub-sidewall SW4. More specifically, as shown in FIG. 2B, in the present embodiment, the second sub-sidewall SW2 (such as the bottom inner sidewall) is opposite to the first sub-sidewall SW1 (such as the top inner sidewall), and the third sub-sidewall SW3 (such as the right inner sidewall) is connected between the first sub-sidewall SW1 and the second sub-sidewall SW2. The fourth sub-sidewall SW4 (such as the left inner sidewall) is connected between the first sub-sidewall SW1 and the second sub-sidewall SW2, and is opposite to the third sub-sidewall SW3. The first sub-sidewall SW1 and the second sub-sidewall SW2 are substantially parallel. In other words, the spacing between the first sub-sidewall SW1 and the second sub-sidewall SW2 is substantially the same from a side adjacent to the first end 122a toward a side adjacent to the second end 122b. Moreover, the spacing between the third sub-sidewall SW3 and the fourth sub-sidewall SW4 tapers off from a side adjacent to the first end 122a toward a side adjacent to the second end 122b.

Accordingly, as shown in FIG. 2A and FIG. 2B, the two reflection units 124 of the present embodiment are, for instance, respectively disposed on the third sub-sidewall SW3 and the fourth sub-sidewall SW4, and configured to reflect the beam 60. As a result, when the light-emitting element 121 emits light, the beam 60 can travel in total reflection between the first sub-sidewall SW1 and the second sub-sidewall SW2 of the taper light guide element 122, and be reflected by the reflection units 124 located on the third sub-sidewall SW3 and the fourth sub-sidewall SW4, so as to be transmitted to the strip light guide element 123.

Since the cross-sectional area of the taper light guide element 122 connected to the light-emitting element 121 and the strip light guide element 123 is gradually reduced, an end of the taper light guide element 122 having a smaller cross-sectional area (i.e., second end 122b) can be used with the strip light guide element 123 having a small diameter, thus reducing the area of each of the strip light guide element 123 and the light-emitting module 120 having the strip light guide element 123. For instance, the strip light guide element 123 of the present embodiment can be an optical fiber for which the diameter is reduced to within the range of 0.1 mm to 3.5 mm. In a preferred embodiment, the diameter of the strip light guide element 123 can is in the range 0.7 mm to 2 mm, wherein the strip light guide element 123 for which the diameter is 1.4 mm can further have better optical characteristics. In this way, the thickness of each of the electro-optical apparatus 100 and the electronic apparatus 110 thereof can be significantly reduced when the electro-optical apparatus 100 adopts a full-color light-emitting diode and scene lighting hue is adjusted, such that the thinning demand of an electronic product can be met. However, the above numerical values and numerical ranges are both exemplary, and are not intended to limit the invention.

Moreover, in the present embodiment, the area of the second end 122b (i.e., end adjacent to the strip light guide element 123) of the taper light guide element 122 is, for instance, equal to or less than the area of an end of the strip light guide element 123 adjacent to the taper light guide element 122. In other words, in an embodiment, at the junction where the taper light guide element 122 and the strip light guide element 123 are connected, the contour of the second end 122b of the taper light guide element 122 can substantially match the contour of the strip light guide element 123; in another embodiment, at the junction where the taper light guide element 122 and the strip light guide element 123 are connected, the area of the second end 122b of the taper light guide element 122 can be suitably slightly less than the area of the strip light guide element 123.

Figure 3:
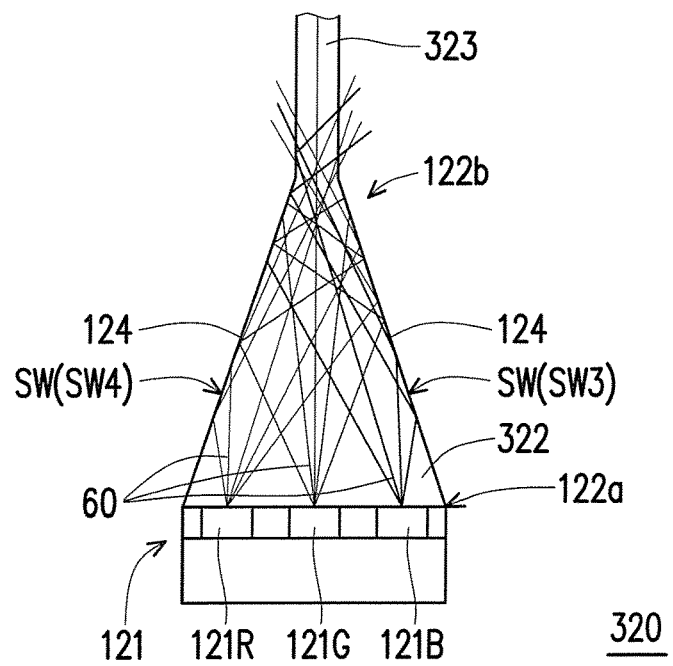
FIG. 3 is a schematic of another light-emitting module of FIG. 1.

However, the invention does not limit the relationship of the taper light guide element and the strip light guide element to the above structure. For instance, please refer to FIG. 3. FIG. 3 is a schematic of another light-emitting module of FIG. 1. A light-emitting module 320 of the present embodiment is similar to the light-emitting module 120 of FIG. 2A, and the difference of the two is as described below. In the present embodiment, a taper light guide element 322 and a strip light guide element 323 of the light-emitting module 320 are an integrally formed width-reduction type optical fiber. Since the functions of the elements in the present embodiment are the same or similar to the functions of the corresponding elements in the above embodiments, details thereof are not repeated herein.

Figure 4:
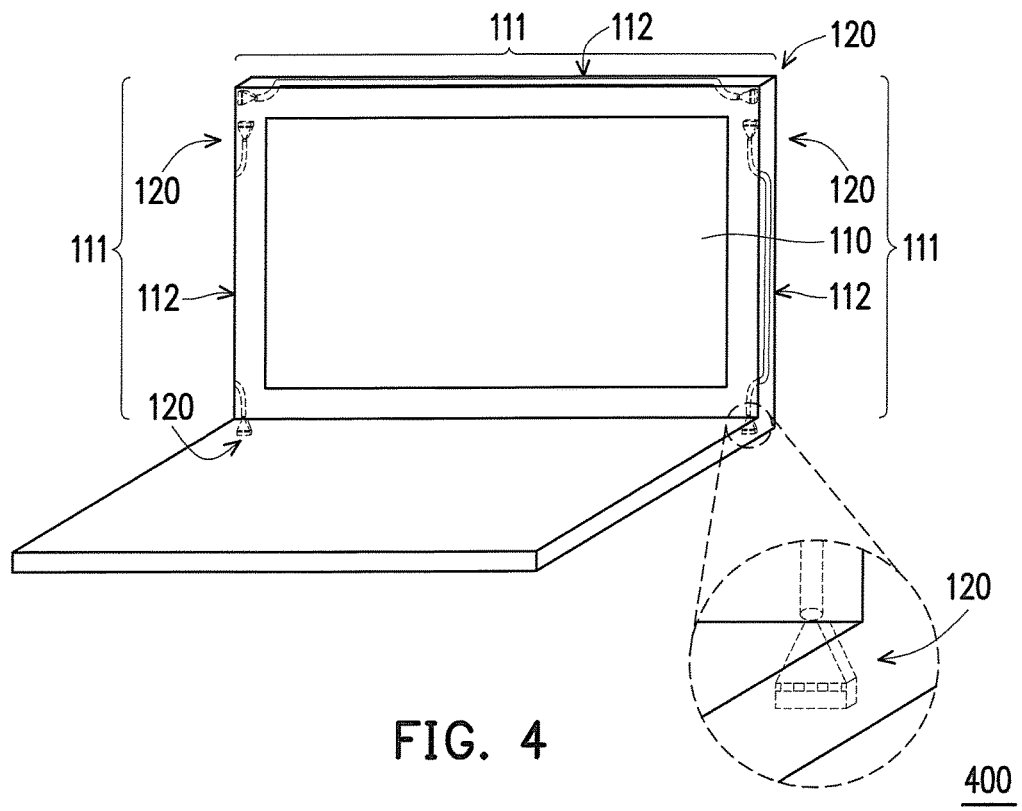
FIG. 4 is an architecture schematic of an electro-optical apparatus of another embodiment of the invention.

FIG. 4 is an architecture schematic of an electro-optical apparatus of another embodiment of the invention. Referring to FIG. 4, an electro-optical apparatus 400 of the present embodiment is similar to the electro-optical apparatus 100 of FIG. 1, and the difference of the two is as described below. In the electro-optical apparatus 400 of the present embodiment, the number of the light-emitting module 120 is, for instance, a plurality, and the number of the light-emitting element 121 is also, for instance, a plurality. Moreover, FIG. 4 illustrates three groups of light-emitting modules 120 as example, wherein each group of light-emitting module 120 is, for instance, composed of the strip light guide element 123 and the taper light guide element 122 interposed between two light-emitting elements 121, and the three groups of light-emitting modules 120 are, for instance, respectively disposed in the containing areas 111 on three sides 112 of the electronic apparatus 110. Specifically, as shown in the light-emitting module 120 on the right side in FIG. 4, and referring to the constituent members of the light-emitting module 120 in FIGS. 2A to 2B and FIG. 3 at the same time, in the present embodiment, the ends of the strip light guide element 123 of the light-emitting module 120 on the right side are connected to the top taper light guide element 122 and the bottom taper light guide element 122. In other words, the strip light guide element 123 on the right side is interposed between the top and bottom taper light guide elements 122 on the right side, and the top and bottom taper light guide elements 122 are respectively connected to the top and bottom light-emitting elements 121 in the light-emitting module 120 on the right side. As a result, when the light-emitting element 121 emits light, the beam 60 can also be transmitted to the strip light guide element 123 via the taper light guide elements 122. However, the number and position of each of the strip light guide element 123, the taper light guide element 122, the light-emitting element 121, and the containing area 111 are only exemplary, and can be suitably adjusted according to design requirement, and are not intended to limit the invention. Moreover, since the functions of the elements in the present embodiment are the same or similar to the functions of the corresponding elements in the above embodiments, details thereof are not repeated herein.

Figure 5:
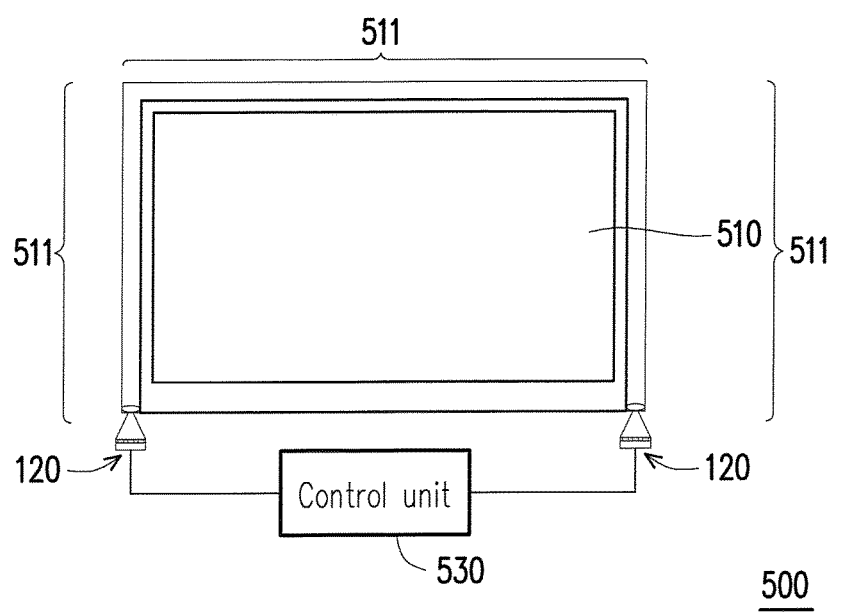
FIG. 5 is an architecture schematic of a scene apparatus of an embodiment of the invention.

The above mainly describes embodiments of a light-emitting module and at least one light-emitting element, taper light guide element, and strip light guide element thereof applied in an electro-optical apparatus. However, in other embodiments, the light-emitting module composed of at least one light-emitting element, taper light guide element, and strip light guide element can further be applied in a scene apparatus. Referring to FIG. 5, FIG. 5 is an architecture schematic of a scene apparatus of an embodiment of the invention. A scene apparatus 500 of the present embodiment is, for instance, a projection screen on which a projector can project an image, wherein a main body 510 of the scene apparatus 500 can be a screen, and a control unit 530 can further be disposed in the scene apparatus 500 according to user needs. Specifically, referring to FIG. 5 and the constituent members of the light-emitting module 120 in FIGS. 2A to 2B and FIG. 3 at the same time, the scene apparatus 500 of the present embodiment includes a main body 510 and at least one light-emitting module 120, wherein the strip light guide element 123 of the light-emitting module 120 is, for instance, extended on the left side, top side, and right side of the main body 510. The main body 510 of the present embodiment has a containing area 511, and the light-emitting module 120 is located in the containing area 511. The control unit 530 is electrically connected to light-emitting units 121R, 121G, and 121B of the light-emitting module 120, and can be configured to switch or adjust the colors of the beams 60 emitted by the light-emitting units 121R, 121G, and 121B of the light-emitting module 120 (refer to FIGS. 2A to 2B and FIG. 3) to achieve the effect of hue adjustment of scene lighting. However, the invention does not limit the scene apparatus to the above screen apparatus, and any object capable of providing scene is within the scope of the invention. Moreover, since the functions of the elements in the present embodiment are the same or similar to the functions of the corresponding elements in the above embodiments, details thereof are not repeated herein.

In the above embodiments, the light-emitting element 121 having a plurality of different colors of the light-emitting units 121R, 121G, and 121B having can be a light-emitting diode (LED) such as an RGB 3-in-1 LED, so as to provide a beam having a plurality of colors. However, in other embodiments, a single chip LED or other light-emitting elements capable of providing lighting effect/scene effect can also be used as the light-emitting unit. Moreover, in the above embodiments, the material of the taper light guide element 122 can be a polymer material, glass, or other suitable materials, and the strip light guide element 123 is an optical fiber. Moreover, in the above embodiments, the reflection unit 124 can be a white reflective sheet, a silver reflective sheet, a reflective coating film, or other suitable reflective sheets. However, the descriptions provided here are all exemplary and are not intended to limit the invention.

Based on the above, the light-emitting module of each of the electro-optical apparatus and the scene apparatus of the embodiments of the invention can adopt a strip light guide element having a small diameter via the configuration of a taper light guide element. Therefore, the thickness of each of the electro-optical apparatus and the scene apparatus can be effectively reduced when scene hue and/or lighting hue are adjusted, such that the thinning demand of an electronic product can be achieved.

The above are only preferred embodiments of the invention, and are not intended to limit the scope of implementation of the invention. That is, any simple change and modification made according to the claims and specification of the invention resulting in the same effect are within the patent scope of the invention. Moreover, any of the embodiments or any of the claims of the invention does not need to achieve all of the objects, advantages, or features disclosed by the invention. Moreover, the abstract and the headings are merely used to aid in searches of patent files and are not intended to limit the scope of the claims of the invention. Moreover, terms recited in the present specification or claims such as "first" and "second" are only used to name the elements or distinguish different embodiments or scopes, and are not intended to limit the maximum or minimum number of the elements.

What is claimed is:

1. An electro-optical apparatus, comprising:
    an electronic apparatus having a containing area; and
    at least one light-emitting module disposed in the containing area and comprising:
        at least one light-emitting element configured to emit at least one beam;
        a taper light guide element disposed on a transmission path of the beam and having a first end and a second end opposite to each other, and the taper light guide element tapers off from the first end toward the second end, wherein the first end is adjacent to the light-emitting element, wherein the taper light guide element has a sidewall connected between the first end and the second end, the sidewall comprises:
            a first sub-sidewall;
            a second sub-sidewall opposite to the first sub-sidewall, wherein a spacing between the first sub-sidewall and the second sub-sidewall is substantially the same from a side adjacent to the first end toward a side adjacent to the second end;
            a third sub-sidewall connected between the first sub-sidewall and the second sub-sidewall; and
            a fourth sub-sidewall connected between the first sub-sidewall and the second sub-sidewall and opposite to the third sub-sidewall, wherein a spacing between the third sub-sidewall and the fourth sub-sidewall is tapered off from a side adjacent to the first end toward a side adjacent to the second end; and
        a strip light guide element disposed on the transmission path of the beam from the taper light guide element, wherein the second end is adjacent to the strip light guide element.

2. The electro-optical apparatus of claim 1, wherein the light-emitting module further comprises:
    at least one reflection unit configured to reflect the beam and disposed on at least a portion of the sidewall of the taper light guide element.

3. The electro-optical apparatus of claim 1, wherein the light-emitting module further comprises:
    two reflection units respectively disposed on the third sub-sidewall and the fourth sub-sidewall and configured to reflect the beam.

4. The electro-optical apparatus of claim 1, wherein the strip light guide element is an optical fiber.

5. The electro-optical apparatus of claim 1, wherein an area of the second end of the taper light guide element is equal to or less than an area of an end of the strip light guide element adjacent to the taper light guide element.

6. The electro-optical apparatus of claim 1, wherein the strip light guide element is an optical fiber for which a diameter is in a range 0.1 mm to 3.5 mm.

7. The electro-optical apparatus of claim 1, wherein the taper light guide element and the strip light guide element are an integrally formed optical fiber.

8. The electro-optical apparatus of claim 1, wherein the containing area is located on at least one side of the electronic apparatus, and the strip light guide element is extended on the side.

9. A scene apparatus, comprising:
a main body having a containing area; and
at least one light-emitting module disposed in the containing area and comprising:
at least one light-emitting element configured to emit at least one beam;
a taper light guide element disposed on a transmission path of the beam and having a first end and a second end opposite to each other, and the taper light guide element tapers off from the first end toward the second end, wherein the first end is adjacent to the light-emitting element, wherein the taper light guide element has a sidewall connected between the first end and the second end, the sidewall comprises:
a first sub-sidewall;
a second sub-sidewall opposite to the first sub-sidewall, wherein a spacing between the first sub-sidewall and the second sub-sidewall is substantially the same from a side adjacent to the first end toward a side adjacent to the second end;
a third sub-sidewall connected between the first sub-sidewall and the second sub-sidewall; and
a fourth sub-sidewall connected between the first sub-sidewall and the second sub-sidewall and opposite to the third sub-sidewall, wherein a spacing between the third sub-sidewall and the fourth sub-sidewall is tapered off from a side adjacent to the first end toward a side adjacent to the second end; and
a strip light guide element disposed on the transmission path of the beam from the taper light guide element, wherein the second end is adjacent to the strip light guide element.

10. The scene apparatus of claim 9, wherein the light-emitting module further comprises:
at least one reflection unit configured to reflect the beam and disposed on at least a portion of the sidewall of the taper light guide element.

11. The scene apparatus of claim 9, wherein the light-emitting module further comprises:
two reflection units respectively disposed on the third sub-sidewall and the fourth sub-sidewall and configured to reflect the beam.

12. The scene apparatus of claim 9, wherein the strip light guide element is an optical fiber.

13. The scene apparatus of claim 9, wherein an area of the second end of the taper light guide element is equal to or less than an area of an end of the strip light guide element adjacent to the taper light guide element.

14. The scene apparatus of claim 9, wherein the strip light guide element is an optical fiber for which a diameter is in a range 0.1 mm to 3.5 mm.

15. The scene apparatus of claim 9, wherein the taper light guide element and the strip light guide element are an integrally formed optical fiber.

16. The scene apparatus of claim 9, wherein the containing area is located on at least one side of the electronic apparatus, and the strip light guide element is extended on the side.

17. The scene apparatus of claim 9, wherein a number of each of the at least one light-emitting element and the at least one beam is a plurality, and colors of the beams are different.

18. The scene apparatus of claim 17, further comprising a control unit electrically connected to the light-emitting elements and configured to switch the colors of the beams.

* * * * *